US006572776B2

(12) United States Patent
Kuznicki et al.

(10) Patent No.: US 6,572,776 B2
(45) Date of Patent: Jun. 3, 2003

(54) METHOD OF STATIC WATER SOFTENING USING ZEOLITES OF NOVEL MORPHOLOGY

(75) Inventors: Steven M. Kuznicki, Whitehouse Station, NJ (US); Valerie A. Bell, Edison, NJ (US); Tadeusz W. Langner, Maplewood, NJ (US); Jacqueline S. Curran, Cranford, NJ (US)

(73) Assignee: Engelhard Corporation, Iselin, NJ (US)

( * ) Notice: Subject to any disclaimer, the term of this patent is extended or adjusted under 35 U.S.C. 154(b) by 34 days.

(21) Appl. No.: 09/737,063

(22) Filed: Dec. 14, 2000

(65) Prior Publication Data

US 2002/0074291 A1 Jun. 20, 2002

(51) Int. Cl.$^7$ .................................................. C02F 1/42
(52) U.S. Cl. ....................................... 210/670; 210/687
(58) Field of Search .................................. 210/670, 687

(56) References Cited

U.S. PATENT DOCUMENTS

| | | | | | |
|---|---|---|---|---|---|
| 3,650,687 | A | * | 3/1972 | McDaniel et al. | 502/68 |
| 3,977,968 | A | * | 8/1976 | Odland | 210/687 |
| 4,603,040 | A | | 7/1986 | Kuznicki et al. | 423/328 |
| 4,839,086 | A | * | 6/1989 | Zaid | 210/674 |
| 4,891,200 | A | * | 1/1990 | Fajula et al. | 423/705 |
| 5,011,667 | A | | 4/1991 | Kuznicki et al. | 423/118 |
| 5,942,207 | A | | 8/1999 | Moini et al. | 423/700 |
| 5,948,383 | A | | 9/1999 | Kuznicki et al. | 423/700 |

* cited by examiner

Primary Examiner—Ivars Cintins
(74) Attorney, Agent, or Firm—Russell G. Lindenfeldar

(57) ABSTRACT

A method of water softening utilizes macrocrystalline aggregates consisting essentially of submicron crystals of aluminosilicate zeolite. The aggregates have a size of greater than 5 microns and are used in a static bed water softening device. Both regenerable and disposable water softening materials can be provided.

19 Claims, No Drawings

METHOD OF STATIC WATER SOFTENING USING ZEOLITES OF NOVEL MORPHOLOGY

FIELD OF THE INVENTION

The present invention is directed to novel aluminosilicate zeolite structures useful as water softening materials. The unique zeolite materials of this invention can be used to form both regenerable as well as disposable static water softening devices.

BACKGROUND OF THE INVENTION

Water softening is a process of water treatment by which undesirable cations, in particular, calcium and magnesium, are removed. Water, which contains such cations, is considered hard, wherein hardness is usually expressed as calcium carbonate equivalents in parts per million. The presence of these cations in water is undesirable for household purposes, such as for bathing, cleaning, and laundry, as well as for industrial purposes, such as boiler feed, food processing and chemical processing, because of reactions which form soap scum, boiler scale, and unwanted byproducts. Hard waters have been softened by precipitation processes which involved the use of hydrated lime or cation-exchange processes which involved the use of sodium-cation exchangers such as aluminosilicate zeolites or hydrogen cation-exchangers such as in the form of resins in bead form.

Water softening with ion exchange material such as resin particles or the like is well-known in the art. During the softening process, or service cycle, the ion exchange resin particles acquire hardness inducing ions ($Ca^{2+}$, $Mg^{2+}$) from the water in exchange for soft ions, (H+, Na+, K+) which do not induce hardness. After prolonged contact of the resin particles with raw water, the ion exchange capacity of the resin is diminished considerably and periodic regeneration of the resin particles must be accomplished, conventionally by contacting the resin particles with a brine solution, i.e., an aqueous solution of sodium chloride or potassium chloride or the like.

The ion exchange process and the regeneration of the ion exchange material are accomplished in a softener or resin tank of well-known construction, while a separate brine tank is conventionally employed to manufacture brine for use during the regeneration cycle. When is initiated in the system, brine is drawn from the brine tank and passed through the bed of ion exchange material in the softener tank to reverse the exchange of ions and revitalize the bed by removing hardness inducing ions and replacing them with sodium ions, for example, from the brine solution.

In general, there has been a progression in the use of ion exchangers for water softening from initial uses of alumina-silica gels to specific aluminosilicate zeolite materials such as zeolite A to the prevalent use of ion exchange resins at the present time. Among the reasons for this progression is that the alumina-silica gels, although being rather inexpensive, were simply not adequate sequestering agents, having neither a rapid rate of sequestration, capacity or selectivity for the hardness ions to be universally effective water softening agents. Zeolite A eventually replaced the alumina-silica gels inasmuch as this particular zeolite had a fast sequestration rate and high capacity for the hardness ions. Zeolite A was a very effective water softening agent, in particular, for use in regenerable static beds which were regenerated by the addition of brine to the bed which displaced the hardness cations of calcium and magnesium with sodium which allowed the zeolite A bed to be reused. Unfortunately, there was found that with extended use of zeolite A, water turbidity became a problem due to the relatively low attrition resistance of the zeolite granules which broke down into minute particles. These minute particles eventually entered into the water stream. Accordingly, although zeolite A was the standard for fixed bed water softening applications for more than a decade, zeolite A has essentially been displaced by the more expensive organic ion exchange resins. The expense and relatively low capacity of these organic resin materials, however, has prompted a need for finding less expensive and improved hardness ion sequestrants so as to expand the use and market of water softening agents.

In commonly assigned U.S. Pat. No. 5,948,383, the present inventors disclosed the formation of hybrid zeolite-silicate compositions (HZSC) which demonstrate unusual and beneficial properties in complexing multivalent cations. These hybrid materials are prepared by crystallizing high aluminum zeolites from highly alkaline/high silica environments. Chemical analysis indicates that an excess of silica is present in these compositions beyond that inherent in the crystalline frameworks thereof. These hybrid materials demonstrate sequestration capacities for cations such as calcium which not only exceed the amount of zeolitic aluminum available for ion exchange, but, in fact, may exceed the theoretical limit possible for zeolite. While the hybrid zeolite-silicate compositions as disclosed in U.S. Pat. No. 5,948,383 are described as being preferably useful in detergent compositions, the patent also sets forth in very general terms that these hybrid compositions show extreme promise as water softening agents. U.S. Pat. No. 5,948,383 does not otherwise disclose the form that these hybrid zeolite-silicate compositions should take to be useful as water softening agents other than as a powdered composition useful in a detergent composition as a detergent builder. The entire content of U.S. Pat. No. 5,948,383, is herein incorporated by reference.

In commonly assigned U.S. application Ser. No. 09/533,771, filed Mar. 23, 2000, now U.S. Pat. No. 6,451,283, issued Sep. 17, 2002, the present inventors have found that high aluminum zeolites, including the hybrid zeolite-silicate compositions of U.S. Pat. No. 5,948,383 could be formed into uniform aggregates of submicron zeolite microcrystals by an in-situ process where essentially all of the aggregate material is between 1 and 5 microns. The aggregates of the application are formed from a solid source of aluminum which is included into a high silica/high alkaline environment. The product of the reaction is the formation of submicron crystals grown in-situ into macroscopic aggregates. What has been found is that even though the materials exist as macroscopic aggregates, the ion exchange kinetics are extraordinarily rapid, reflecting the inherent rate of the substituent submicron crystals. The application states that the advantages of maintaining the substituent crystals as coherent macroscopic aggregates is both in the ease of handling when the aggregates are used as a substituent in manufacturing compounds such as detergent mixtures as well as in minimizing pressure drop in flow-through application such as water purification/softening filters. The application also discloses that surprisingly, the rate of sequestration for multivalent cations can be improved even if only low levels of occluded silicate remain the zeolite. The morphology of the zeolites produced appears to have a profound and advantageous effect on hardness removal. Thus, the morphology of the zeolite aggregate containing the submicron crystalline zeolites is crucial to the hardness removal performance and that even if all the silica can be removed, the sequestration rate for complexing multivalent cations can be enhanced over large crystal zeolites.

As further disclosed in U.S. Ser. No. 09/533,771, the elevation of electrolyte concentration in the high silica/high alkaline synthesis mixture used to form the aggregates enhances the water softening properties of the materials. The addition of soluble salts to the synthesis mixture results in the formation of smaller submicron crystals (as manifested by increased exterior surface area) without reduction of aggregate particlesize (typically 1–5 microns). The entire content of U.S. Ser. No. 09/533,771 is herein incorporated by reference.

It is a primary objective of the present invention to produce superior static water softening materials.

It is another object of the present invention to provide water softening materials having improved hardness ion sequestering abilities relative to ion exchangers used past and presently.

It is another object of the present invention to provide a zeolitic water softening material which has excellent multivalent cation sequestering abilities and can replace the expensive organic ion exchange resin materials.

It is a further objective of this invention to produce superior static water softening materials by applying the calcium sequestering abilities of the detergent builders discovered by the present inventors and set forth in the previously discussed commonly assigned U.S. Pat. No. 5,948,383 and U.S. Ser. No. 09/533,771.

Still another object of this invention is to provide a water softening material formed of macroscopic aggregates of submicron zeolite crystals which have superior sequestering abilities and which are resistant to attrition.

Yet another object of this invention is to provide regenerable and disposible water softening materials formed of high aluminum zeolites including hybrid zeolite-silicate compositions.

SUMMARY OF THE INVENTION

It has now been found that superior zeolite and hybrid zeolite-silicate static water softening materials can be made by processes disclosed by the present inventors in U.S. Pat. Nos. 5,948,383; 5,942,207 and U.S. patent application Ser. No. 09/533,771. Important to the adaption of this prior technology for forming detergent builders to applications such as static water softening is achieving the appropriate physical form, including in-situ microspheres and larger particles formed as aggregates of submicron crystals, as well as impregnation of smaller aggregates or powders into porous supports such as carbon blocks and paper. Stand alone aggregates of submicron zeolite microcrystals can be formed whereby the aggregate material can be of a size sufficient for use in static water softening. Surprisingly, even though the water softening materials exist as macroscopic aggregates, the exchange kinetics are extraordinarily rapid, reflecting the inherent rate of the substituent submicron crystals.

Water softening materials of this invention can be formed from zeolites such as zeolite A, zeolite X and high aluminum analogs, as well as high aluminum analogs of gismondine, e.g. zeolite B, P and MAP, among others, and the HZSC analogs of such zeolites. The synthesis environment of the hybrid zeolite-silica compositions as described in aforementioned U.S. Pat. No. 5,948,383 has been found to promote the formation of aggregates of submicron zeolite crystals. Such compound aggregates manifest the rapid exchange properties of submicron crystals and the favorable handling properties of macroscopic aggregates. This favorable set of properties results from the high alkalinity of the zeolite synthesis mixture (versus comparable zeolite synthesis) in combination with the propensity of aggregates to retain mechanical integrity in silica-rich environments.

The synthesis of zeolite A has been well established owing to its wide employment as an ion-exchange agent, especially useful in water softening applications such as detergent building. The use of zeolite A as an ion-exchanger has been successful owing to the high aluminum content thereof. With a Si/Al ratio of 1.00, the lowest possible for a zeolite according to the Rule of Lowenstein, high aluminum environments have generally been used in the manufacture of zeolite A. The employment of a silica-enriched environment is counter-intuitive for the synthesis of such high aluminum materials. However, the employment of a silica-enriched environment instills several properties in a synthesis mixture. First, it allows the addition of substantial hydroxide and/or other electrolytes beyond that which would be applicable to a "normal" zeolite synthesis procedure. Such enhanced alkalinity/electrolyte levels promote the nucleation of zeolite seed crystals. Secondly, silica-enhanced environments promote retention of macroscopic particle integrity in the synthesis of aluminosilicates. These two properties, enhanced nucleation and retention of particle integrity, lead to the formation of massive numbers of submicron crystals of the zeolite forming as macroscopic aggregates, especially in in-situ synthesis when a solid source of aluminum is employed, such as metakaolin and/or alumina.

Microcrystalline zeolites formed into aggregates having sizes of at least 20 microns can be formed for use in static water softening processes without the prior turbitity problems which plagued prior art zeolite water softening materials. In particular, in-situ formed aggregates composed of interlocked submicron zeolite crystals are substantially less prone to the attrition problems which reduced the effectiveness of zeolites for water softening despite the greater volumetric capacity of zeolites as compared to the present ion exchange resins. Depending upon the type of zeolite formed, both regenerable and disposable water softening materials can be produced. Importantly, smaller aggregates of the zeolites, including powders, especially HZSC powders can be incorporated into porous base materials such as carbon or paper by impregnation, coating or mixing therewith to expand even further the uses of the zeolite compositions of this invention for static water softening.

DETAILED DESCRIPTION OF THE INVENTION

The water softening materials of this invention are either present as powdered HZSC materials contained within the pores of a porous matrix or stand alone macroscopic aggregates of submicron zeolite microcrystals of high aluminum zeolites or HZSC analogs and which exhibit rapid ion exchange of hardness cations and have a high exchange capacity. The present invention expands upon the detergent builder technology developed by the present inventors such as disclosed in U.S. Pat. No. 5,948,383 and U.S. Ser. No. 09/533,171 to form aluminosilicate zeolites in novel configurations for highly effective static water softening.

The prior sequestrants (detergent builders) developed by the present inventors were based on the formation of hybrid zeolite-silicate materials. Thus, in addition to zeolites, the ability of silicates to complex ions such as calcium and especially magnesium has long been known and sodium silicate has long been employed as a cheap, low performance detergent builder. Recently, complex silicates have been developed which are claimed to be competitive with high performance zeolites as detergent builders.

The capacity for silicates to complex ions such as calcium and magnesium is inversely proportional to silicate chain length and directly proportional to the electronic charge on that chain fragment. Silicates depolymerize with increasing alkalinity. At moderate pH silicates are polymeric. However, at much higher pH's silica not only becomes predominantly monomeric, but that monomer may possess multiple charges. These small, highly charged silicate fragments when exposed to solutions bearing multivalent cations, act as very powerful high capacity sequestration agents. The present inventors in commonly assigned U.S. Pat. No. 5,948,383 (Kuznicki, et. al.) disclose isolating and stabilizing substantial concentrations of such charged silicate species within zeolite cages where ions such as calcium are free to enter from an aqueous environment and react with these powerful sequestration agents. The zeolites of this patent have been characterized as hybrid zeolite-silica compositions (HZSC) which demonstrate unusual and beneficial properties in complexing multivalent cations. Such hybrid materials are prepared by crystallizing high aluminum zeolites in highly alkaline/high silica environments. Chemical analysis indicates an excess of silicate in these species beyond that inherent to their crystalline frameworks. Such materials demonstrate sequestration capacities for cations such as calcium which not only exceed the amount of zeolitic aluminum available for ion-exchange, but in fact, may exceed the theoretical limit possible for a zeolite. It is believed that the key mechanism in the effectiveness of these patented materials is derived from the ability of zeolite cages to isolate and stabilize much smaller, more highly charged silicate units. These silicate units are introduced during synthesis of said hybrid zeolite-silica compositions by providing an environment wherein silica in the reaction mixture is depolymerized to highly charged predominantly monomeric units before crystallization begins.

These occluded silicate units are readily visible in $^{29}$Si NMR spectra. The zeolite framework and occluded silicate units act in concert, as a new type of hybrid composition, showing properties neither zeolites, silicates nor physical blends of the two demonstrate. In addition to high capacity, these new hybrid compositions demonstrate unusually rapid rates of sequestration, and are, accordingly, considered to be superior detergent builders. In this invention, such hybrid zeolite-silica compositions are formed into static water softening materials.

The inventors have further disclosed in copending, commonly assigned U.S. Ser. No. 09/533,771 that the conditions used to form the hybrid zeolite-silica compositions as described in U.S. Pat. No. 5,948,383, can yield novel zeolite particle morphologies. The zeolite particles which are formed are extremely rapid cationic sequestrants. Prior commercial zeolite A suffers from slow exchange kinetics. This is especially true in cold water where the rate problem renders it essentially ineffective. While zeolite A, by definition, contains equimolar aluminum and silicon in its framework structure and thus the maximum possible zeolite ion-exchange capacity, useful ion-exchange capacity in most processes, however, is a dynamic function based on inherent capacity, ion selectively and kinetics of exchange. While zeolite A is a fixed composition with a fixed exchange capacity and fixed ion selectivities, the kinetics of exchange vary widely with the physical and morphological properties of zeolite A crystals and the aggregates into which they are formed. Microcrystalline zeolite A has long been known to improve exchange kinetics, but these submicron particles have been unusable in real world applications. Submicron microcrystals grown into macroscopic aggregates solves this problem, yielding the kinetic advantages of microcrystalline exchangers and the handling properties of macroscopic ensembles.

U.S. Ser. No. 09/533,771 discloses that the high silica, high alkalinity reaction environments used for producing high aluminum zeolites also produces drastic changes in the morphology of the zeolite particles which are formed. The reaction medium results in nucleation effects which minimize individual crystal sizes without concomitant reduction in overall zeolite particle or aggregate formation. The morphology of the zeolite particles is believed to result in vastly improved rates of cation sequestration without disadvantageously altering particle size.

Thus, zeolite particles with novel morphology compared with a conventional zeolite particle can be formed. A commercial zeolite A typically comprises zeolite crystals of which each is about 1–5 microns. Zeolite A particles which have been formed using the high silica, high alkalinity environments in accordance with the disclosure of U.S. Ser. No. 09/533,771 comprise macroscopic aggregates of zeolite microcrystals. Each aggregate is formed in-situ and has a size of about 1–5 microns similar to the size of the individual crystals of the commercial zeolite A. However, each aggregate is formed of a multiple of submicron zeolite crystals each having a size of from about 0.05 to 0.5 micron. The submicron crystals grown into macroscopic aggregates yield the kinetic advantages of microcrystalline exchange and outstanding cation sequestration rates and the handling properties of the larger size particles. Importantly, no extraneous binder composition is needed to consolidate the zeolite crystals.

The aggregates of microcrystalline zeolites this invention when used as stand alone water softening materials have an average size of at least 20 microns, preferably at least 50 microns and, most preferably, at least 100 microns. Powdered zeolites, such as the HZSC materials discussed above in U.S. Pat. No. 5,948,383 and the 1–5 micron aggregates of microcrystalline zeolites as disclosed in U.S. Ser. No. 09/533,771 are also useful for water softening, but such materials are incorporated into a porous matrix. In general, 5 to 150 wt. % relative to the total weight of the porous matrix includes the smaller aggregates or HZSC powder as mixed with, incorporated in, or coated on the porous matrix such that at least a portion of the zeolite ion-exchange is present in the pores of the matrix. Preferably, the aggregate or HZSC powder will comprise 10–75 wt. % of the porous matrix.

Compositions of the invention whether powder or aggregate can be prepared by processes disclosed in aforementioned U.S. Pat. No. 5,948,383, and U.S. Ser. No. 09/533, 771, the entire contents of each of which have previously been incorporated by reference. Such processes are directed to forming high aluminum zeolites surprisingly from reaction environments containing excess silica. High aluminum zeolites, in general, are defined as having a Si/Al≦1.1. Conversely, excess silica in the reaction mixture is herein defined as having a Si/Al≧1.1. The zeolites of this invention are provided with the desired morphology by reacting a solid aluminum source such as a dried aluminosilicate gel, powdered gibbsite or more preferably, solid clays such as metakaolin or even raw kaolin with concentrated silicate solutions at pH values above 12 at temperatures ranging from about ambient to about 100° C. and at atmospheric pressure. The high silica reaction environment also suppresses the formation of iron oxide, probably by the formation of uncolored iron silicate. This allows "white" zeolites to be grown from natural reactants such as clays. The ability to use raw reactants such as uncalcined kaolin may have a substantive impact on the economics of zeolite production.

It is preferred, if not crucial, for the preparation of certain zeolites having the desired morphologies, that the aluminum source must be added last to the reaction mixture. Thus, if all the ingredients of the reaction mixture are added together and heated to crystallization temperature, a conventional zeolite will be formed. Thus, neither the hybrid zeolite-silicate compositions nor the aggregates of microcrystalline zeolites may be formed with the desired aluminum content. It is even more desirable to prepare the compositions of this invention by heating the reaction mixture at temperatures of from 50° C. to 85° C. before the addition of the aluminum source for a period of time of about 30 minutes or longer. The reaction medium also includes an excess of an alkaline source. The term "excess" herein means that the amount of alkaline is greater than that commonly used in the synthesis of the specific zeolite sieve being prepared.

The process conditions as described above containing high levels of silica and excess alkaline surprisingly form high aluminum zeolites. Those zeolites which contain occluded silicate have been characterized as hybrid-zeolite silica compositions in commonly assigned U.S. Pat. Nos. 5,942,207 and 5,948,383. These hybrid zeolite-silica compositions have extraordinary capacity to complex multivalent cations such as calcium.

While not wishing to be bound by any theory of operation of how high aluminum zeolites can be formed from high silica reaction environments, it appears that the large silica content retards aluminum polymerization while the high alkalinity prevents silica polymerization. The result is the formation of 1:1 Si/Al chains. Moreover, heating the reaction mixture for a period of time (for example 30 minutes) prior to aluminum addition allows the silicate to depolymerize and form predominantly occluded silicate units contained within the pores of the zeolite. These small, highly charged silicate fragments are believed to yield the drastically improved sequestering properties of the hybrid zeolite silica compositions.

The zeolite compositions disclosed in U.S. Pat. No. 5,948,383 and which are most useful water softening agents include zeolitic molecular sieves that have a high $Al_2O_3$/$SiO_2$ molar ratio, e.g., $SiO_2$/$Al_2O_3$ molar ratios of 3 or below, preferably in the range of 2 to 3. Zeolitic species which can be produced by the methods of this patent include type P (also referred to as type B), zeolite A, faujasite type such as high alumina X types, chabazite analogs and mixtures thereof and their HZSC analogs.

After crystallization, the zeolite crystals are washed thoroughly with water, preferably deionized water, to remove sodium and spurious silica from the crystal surfaces. In some cases, some replacement of sodium by hydrogen may take place during washing. The crystals can be washed with solutions other than those of pure water. Up to about 40% by weight of the silica content of the washed crystals is due to the occluded silicate species. Usually up to about 20% by weight of the silica content of the zeolite will be occluded silicate. Thus, the total $SiO_2$ analysis as determined by conventional chemical analytic means exceeds that of the $SiO_2$ that would be expected based on the framework silica content as indicated by x-ray powder patterns and $^{29}Si$ NMR analysis of the composition. The occluded silicate portion of this silica is readily ascertained from the $^{29}Si$ NMR peaks at about −81 to −85 ppm.

The zeolite compositions which contain up to 40 wt. % of the total silica as occluded non-zeolite framework silicate have been characterized as hybrid zeolite-silica compositions in commonly assigned U.S. Pat. Nos. 5,942,207 and 5,948,383 and have shown an outstanding capacity to complex multivalent cations. According to these patents, the non-zeolite occluded silicate in amounts of 5 to 40 wt. % relative to the silica content of the composition is important in achieving the added sequestering ability of the composition.

In U.S. Ser. No. 09/533,771, it has been shown that the morphology of the zeolite and analagous HZSC compositions which can be produced from the high silica, high alkaline reaction medium is highly determinative in providing the zeolite with vastly improved sequestration capabilities. By utilizing solid sources of aluminium in the synthesis mixture it has previously been found that aggregates of 1–5 microns in size and containing submicron zeolite crystals could be formed. These macrocrystalline aggregates of microcrystalline zeolites rapidly complex with multivalent cations such as calcium. To form aggregates having a size of at least 20 microns for static water softening, solid aluminum sources having a particle size of at least 5 microns are added to the reaction medium. The excess silicate bridges the aluminum particles to aid in forming the larger aggregates of zeolite crystals. For larger water softening aggregates, larger sizes of solid aluminum sources need to be used. Crystallization from aluminum-containing microspheres, such as kaolin or metakaolin microspheres having the desired final product aggregate size is very useful. Such microspheres are known in the art and can, for example, be prepared by spray drying aqueous kaolin slurries. Such microspheres and methods of making same are well-known, in particular, in the formation of fluid catalytic cracking (FCC) catalysts. After crystallization from the high silica, high alkaline reaction medium, the aggregate of submicron zeolite crystals can be washed to remove sodium and spurious silica from the crystal surfaces to provide a non-zeolite silicate content of up to 40 wt. % of the total silica present in the composition, but preferably to a level of less than 20 wt. %, and, more preferably, to a non-zeolite silicate content 0 to 5 wt. % to yield zeolite compositions showing vastly improved rates of sequestration.

Preferably, the compositions of the zeolitic molecular sieves and occluded silicate whether as a HZSC powder or macroscopic aggregate may be represented by the molar formula:

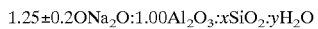

$$1.25 \pm 0.2 ONa_2O:1.00Al_2O_3:xSiO_2.yH_2O$$

wherein x is 2.05 to 2.90 in the case of zeolite B;

x is 2.05 to 2.90 in the case of zeolite A;

x is 2.05 to 2.90 in the case of faujasite;

x is 2.05 to 2.90 in the case of chabazite; and y is 0–20.

It must be noted that $Na_2O$ may be exchanged from such materials by extensive washing and falsely low cation readings may be obtained.

It has been found that the zeolites formed by the processes of this invention and having the desired aggregate morphology, including HZSC aggregate materials can be provided with improved sequestration rates by elevating the electrolyte concentration in the synthesis mixtures beyond that inherent to the caustic necessary for synthesis. In this aspect of the invention, the high silica, high alkaline environment is further provided with an additional electrolyte concentration. Such electrolytes can be salts selected from among the group consisting of nitrates, phosphates, bicarbonates, carbonates, borates, nitrites, sulphates, chlorides, etc. Specific non-limiting examples include sodium carbonate, trisodium polyphosphate (TSPP), sodium borate as well as sodium chloride among others. The salt additions presumably result in the formation of smaller submicron crystals as the zeolite crystals grow around the salt nucleation sites. As the level of salt increases, the number of nucleation sites increase and the size of the individual crystals becomes smaller. The level of added salt or electrolyte into the reaction mixture can vary widely. However, it has been found that amounts of electrolyte corresponding to about 10% to about 100% by weight based on the aluminum-containing reactant yields the increased reaction rate and improvement in surface area of the zeolite which corresponds to the reduction in individual zeolite crystal size. Importantly, it has been found that while the size of the individual submicron crystals becomes smaller, this does not result in any reduction of in-situ aggregate particle size. These aggregates containing the smaller submicron crystals of the zeolite have shown improved hardness sequestration rates. Important also, it has been found that the added electrolytes are not occluded into the zeolite framework as is the excess silica.

An additional advantage of intentionally elevating the electrolyte level in the zeolite synthesis mixtures in accordance with this invention is an enhanced rate of zeolite crystal and aggregate formation. Accordingly, the reaction time can be shortened or the reaction temperature can be reduced, both of which favorably impact on the economics of zeolite manufacture. While this effect has been demonstrated for the high silica, high alkaline environments used to make zeolites in the process of this invention, it is likely that the elevated electrolyte content would be directly applicable to classical zeolite synthesis. Thus, it would be expected that crystals of zeolite grown at elevated electrolyte levels would be smaller than those grown under equivalent conditions without salt addition. For the synthesis of in-situ zeolite particles, this might well result in an alternative means to prepare macroscopic aggregates of microcrystalline zeolites without the need for the high silica, high alkaline environments.

In one of its broadest aspects, the present invention is directed to stand alone static water softening compositions which comprise a macroscopic aggregates of smaller zeolite crystallites. It is preferred that these macroscopic aggregates be formed in the high silica, highly alkaline environments as described previously as it has been found that aggregates of submicron zeolite crystals can be formed in which the zeolite has a high aluminum content and, thus, the maximum cation exchange capacity. However, it may be possible to form aggregates of submicron or smaller zeolite crystals without specifically following the teachings of the previously mentioned U.S. Pat. No. 5,948,383 or copending U.S. Ser. No. 09/533,771. For example, as stated above, the use of additional electrolyte in a zeolite synthesis mixture may well provide numerous nucleation sites on an aluminum containing microsphere or other solid surface to yield in-situ grown zeolite crystallites with the aluminum source. The addition of surfactants or other types of wetting agents to a zeolite synthesis mixture may also result in the formation of aggregates containing microscopic reactant particles from which the active zeolites can be formed. Such water softening materials maintain the advantageous sequestration capabilities of the individual zeolites and, at the same time, provide improved attrition resistance as the individual zeolite crystals are locked into a macroscopic matrix.

The present invention is applicable to the formation of both regenerable and disposable water softening materials formed of the zeolite-silicate powders or macroscopic aggregates of the smaller zeolite crystals including related HZSC materials. Whether the water softening composition is used in a regenerable system or a disposable system, depends upon the particular zeolite formed. For use in regenerable water softening systems, such as used for treating the whole water supply to a household in which a brine solution is used to displace the hardness cations from the zeolite composition for reuse, the zeolite composition should be a rapid water hardness sequestrant and, as well have a high capacity for capturing the water hardness cations. For disposable systems, such as filters for treating water at point of use such as coffee filters, and the like, end of tap devices such as used on the end of a water faucet, the zeolite used must again have a rapid sequestration rate, have a high capacity, and further, be highly selective for the hardness cations such as calcium and magnesium to the extent that such zeolites are not readily re-exchangeable with a sodium or hydrogen ion.

For use as a regenerable zeolite composition, zeolite A in the formation of macroscopic aggregates of submicron zeolite A crystals is particularly useful inasmuch as zeolite A in the aggregate form of this invention rapidly sequesters the hardness cations and has a high capacity for such cation exchange. The zeolite A, however, is not solely selective to calcium such that it can be readily regenerated with a separate salt or brine solution to displace the hardness cations such as with sodium for reuse in water softening applications. The particular type of water softening apparatus used with the stand alone aggregates does not form any part of this invention, and, as such, any known water softening structures which can hold the aggregates and provide for regeneration of the ion-exchange sites on the zeolite can be used. On the other hand, it is found that P-type zeolites are particularly useful for disposable systems since the P-type zeolites are highly selective for multivalent cations such as calcium and magnesium. These cations cannot be readily removed by ion exchange with a separate salt solution.

Further, the HZSC materials in powder form as described in U.S. Pat. No. 5,948,383 are particularly useful for disposable water softening devices in which the hybrid materials are impregnated into porous supports such as carbon blocks or paper. The hybrid zeolite-silica compositions are particularly useful in the non-regenerable, disposable water softening applications because of the unprecedented dynamic calcium capacity of these materials. For example, commercial Amberlite® exchange resins have only about 1.2 meq/cc actual calcium capacity. HZSC materials with static capacities approaching 10 meq/gm and packing densities approaching 0.7 gms/cc could exceed the capacity of the resins by more than a factor of 5. It is contemplated in this invention that powdered HZSC materials on the order of 1 micron or less can be readily impregnated into or coated onto a porous support and used as a filter or the like for point of use water softening applications. Likewise, smaller, e.g. 1–5 microns, macroscopic aggregates of submicron zeolite crystals including HZSC materials could also be incorporated or otherwise impregnated into porous supports. It is contemplated that macroscopic aggregates of submicron zeolite crystals wherein the aggregates are greater than 5 microns would be more useful as a stand alone water softening material. Such aggregates could also include the zeolite-silicate hybrids or materials in which most, if not all, the occluded silicate has been removed.

EXAMPLE 1

Microspheres of microcrystalline Zeolite A were prepared by combining 125 grams of Luminex®-derived 40 micron microsphere metakaolin with a solution containing 22 grams N-Brand sodium silicate and 390 grams 50% NaOH solution in 422 grams of water. This mixture was heated to 65° C., with stirring, and reacted for 3 hours. The resultant product was hot washed to remove residual traces of entrained silica. Particle size distribution indicated retention of approximately 40 micron average size. SEM indicated individual crystal size well below 0.5 micron, much smaller than typical commercial Zeolite A.

A test was conducted to assess the relative performance of the microspheres for multivalent cation sequestration versus a commercial organic ion-exchange resin employed in contact water softening by Brita. The test was carried out in the following manner:

1) Calcium/Magnesium solution was made following Brita's procedure for test water preparation (Temporary Hardness Reduction Protocol).

2) Filtering was achieved by using Buchner funnels with no vacuum applied. Rates of filtering were comparable.

3) Volumes of 50 ml sample and 300 ml solution were used.

4) Brita media and zeolite A microspheres as prepared above were compared.

5) Compared concentration was measured in test water before and after filtering.

The difference in performance between the current commercial material and the microspheres of microcrystalline Zeolite A were dramatic. A stream containing 6.88 gpg calcium was reduced to 4.67 gpg using the commercial material. The same stream was essentially evacuated of calcium (0.185 gpg reading, probably interference from residual magnesium) using the test microspheres. No turbidity was observed in the treated solution.

EXAMPLE 2

Powered versions of HZSC materials were prepared by combining 125 grams of Luminex®-derived powdered metakaolin with a solution containing 66 grams N-Brand sodium silicate, 240 grams 50% NaOH solution and 100 grams STPP in 490 grams water. This mixture was heated to 65° C., with stirring, and reacted for 8 hours. Particle size distribution averaged 3 microns. SEM indicated individual crystal size well below 0.5 micron. Chemical analysis indicated the substantial silica incorporation characteristic of HZSC. This material may be incorporated into a porous matrix such as carbon or paper.

EXAMPLE 3

Essentially pure microspheres of HZSC material are made by combining 125 grams of metakaolin microspheres with a solution containing 100 grams N-Brand sodium silicate, 50 grams STPP and 240 grams of 50% NaOH solution in 490 grams of water. The resultant mixture is reacted at 65° C. for 15 hours with stirring. The material retains its gross particle size distribution while forming interlocked masses of crystalline HZSC. Such a material, or larger particles, could be employed directly as a stand alone disposable calcium adsorbent or could be incorporated into a porous matrix such as carbon or paper.

EXAMPLE 4

Powdered versions of P-type zeolite materials were prepared by combining 125 grams of Luminex®-derived powdered metakaolin with a solution containing 66 grams N-Brand sodium silicate, 240 grams 50% NaOH solution and 100 grams STPP in 490 grams water. This mixture was heated to 65° C., with stirring, and reacted for 8 hours. The silica is removed from what is at this point an HZSC P-analog by washing with water near 100° C. Particle size distribution averages 3 microns. SEM indicates individual crystal size at well below 0.5 micron, an important feature, especially for cold water applications. Chemical analysis indicates that the substantial silica incorporation characteristic of HZSC is not present. This material may be incorporated into a porous matrix such as carbon or paper.

EXAMPLE 5

Essentially pure microspheres of P-type zeolite are made by combining 125 grams of metakaolin microspheres with a solution containing 100 grams N-Brand sodium silicate, 50 grams STPP and 240 grams of 50% NaOH solution in 490 grams of water. The resultant mixture is reacted at 65° C. for 15 hours with stirring. The material retains its gross particle size distribution while forming interlocked masses of crystalline HZSC. These formed particles are converted to microspheres of microcrystalline P-type zeolites by thorough washing in water approaching 100° C. releasing the entrained silica. Such a material, or larger particles, could be employed directly as a stand alone disposable calcium adsorbent or could be incorporated into a porous matrix such as carbon or paper.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A method of removing multi-valent water hardness cations from a water stream comprising passing said water stream in contact with a static bed of water softening material, said water softening material comprising macroscopic aggregates consisting essentially of submicron size aluminosilicate zeolite crystals, said macroscopic aggregates having an average size of at least 20 microns.

2. The method of claim 1, wherein said submicron size aluminosilicate zeolite crystals have a sire range of from 0.05 to 0.5 micron.

3. The method of claim 1, wherein said macroscopic aggregates consisting essentially of said submicron size aluminosilicate zeolite crystals are formed in-situ.

4. The method of claim 1, wherein said macroscopic aggregates have a size of at least 50 microns.

5. The method of claim 1, wherein said macroscopic aggregates have an average size of at least 100 microns.

6. The method of claim 5, wherein said submicron size aluminosilicate zeolite crystals have an average size range of from 0.05 to 0.5 microns.

7. The method of claim 1, wherein said aluminosilicate zeolite is a high aluminium zeolite having a Si/Al of less than or equal to 1.1.

8. The method of claim 1 comprising periodically regenerating said water softening material by contacting said static bed of macroscopic aggregates with a salt solution which displaces multi-valent water hardness cations from said zeolite.

9. The method of claim 8, wherein said macroscopic aggregates are periodically contacted with a sodium chloride solution to displace multi-valent water hardness cations from said zeolite.

10. The method of claim 8, wherein said aluminosilicate zeolite is zeolite A.

11. The method of claim 1, wherein said aluminosilicate zeolite crystals optionally contain occluded silicate in amounts up to 40% by weight relative to the total $SiO_2$ content of the zeolite, and wherein said occluded silicate is not part of the framework of said zeolite crystals.

12. The method of claim 11 wherein said occluded silicate is optionally present in amounts of up to 20% by weight based on the total $SiO_2$ content of the zeolite crystals.

13. The method of claim 12, wherein said occluded silicate is optionally present in amounts of less than 5 weight % of the total $SiO_2$ content of said zeolite crystals.

14. The method of claim 1, wherein said water stream includes a household water supply.

15. The method of claim 1, wherein said water stream comprises an industrial water supply.

16. The method of claim 1, wherein said aluminosilicate zeolite is a high aluminum analog of gismondine.

17. The method of claim 16, wherein said aluminosilicate zeolite is zeolite B or zeolite P.

18. The method of claim 16, wherein said aggregates are disposed of after repeated contact with said water stream, said aggregates being substantially incapable of being regenerated by displacement of multi-valent water hardness cations with a separate salt solution.

19. The method of claim 1, wherein said aluminosilicate zeolite is a high aluminum analog of zeolite X.

* * * * *

UNITED STATES PATENT AND TRADEMARK OFFICE
CERTIFICATE OF CORRECTION

PATENT NO. : 6,572,776 B2
DATED : June 3, 2003
INVENTOR(S) : Kuznicki et al.

It is certified that error appears in the above-identified patent and that said Letters Patent is hereby corrected as shown below:

<u>Column 12,</u>
Line 51, change "sire" to -- size --

Signed and Sealed this

Fifteenth Day of July, 2003

JAMES E. ROGAN
*Director of the United States Patent and Trademark Office*